US008083575B2

(12) United States Patent
Kim

(10) Patent No.: US 8,083,575 B2
(45) Date of Patent: Dec. 27, 2011

(54) CAR INTERIOR ODOR AIR VENTILATION SYSTEM

(76) Inventor: Hong Min Kim, Scarborough (CA)

( * ) Notice: Subject to any disclaimer, the term of this patent is extended or adjusted under 35 U.S.C. 154(b) by 1104 days.

(21) Appl. No.: 11/903,699

(22) Filed: Sep. 25, 2007

(65) Prior Publication Data
US 2009/0081938 A1 Mar. 26, 2009

(51) Int. Cl.
B60H 10/00 (2006.01)
(52) U.S. Cl. ........... 454/120; 454/907; 297/180.14; 297/180.11; 297/452.2
(58) Field of Classification Search .......... 454/120, 454/907; 297/180.14, 180.11, 452.2
See application file for complete search history.

(56) References Cited

U.S. PATENT DOCUMENTS

| 3,101,488 A * | 8/1963 | Peebles ........................ 5/423 |
| 3,654,534 A * | 4/1972 | Fischer ...................... 361/215 |
| 4,981,324 A * | 1/1991 | Law .......................... 297/180.11 |
| 5,102,189 A * | 4/1992 | Saito et al. ................ 297/180.14 |
| 5,176,424 A * | 1/1993 | Tobita et al. ............... 297/284.1 |
| 5,342,238 A * | 8/1994 | Segerpalm et al. ........... 454/136 |
| 5,450,894 A * | 9/1995 | Inoue et al. ................. 165/43 |
| 5,926,875 A * | 7/1999 | Okamoto et al. ............. 5/605 |
| 6,003,950 A * | 12/1999 | Larsson ..................... 297/452.42 |
| 6,059,018 A * | 5/2000 | Yoshinori et al. ............. 165/42 |
| 6,374,623 B1 * | 4/2002 | Gubbels ..................... 62/176.6 |
| 6,760,928 B1 * | 7/2004 | Rodriguez ................... 4/217 |
| 6,894,620 B2 * | 5/2005 | Reinhardt et al. ............ 340/607 |
| 6,926,601 B2 * | 8/2005 | Aoki et al. ................. 454/121 |
| 7,131,689 B2 * | 11/2006 | Brennan et al. ............ 297/180.14 |
| 7,913,332 B1 * | 3/2011 | Barnhart .................... 5/423 |
| 2003/0171090 A1 * | 9/2003 | Shaikh ...................... 454/66 |

FOREIGN PATENT DOCUMENTS

JP 09206173 A * 8/1997

* cited by examiner

Primary Examiner — Steven B McAllister
Assistant Examiner — Ireini Botros
(74) Attorney, Agent, or Firm — David W. Wong

(57) ABSTRACT

A ventilation system is provided in an automobile by forming an intake opening in the top of the seats in the automobile. A telescopic pipe is located in the cushion of the seat with its top end mounted to the intake opening and its lower end mounted to an outlet port at the underside of the seat. An ammonia sensor and a air drawing fan is mounted in the telescopic pipe. The air drawing fan is actuated by the ammonia sensor with the control of a seat fan module when the ammonia sensor detects body waste odor air expelled by a passenger sitting in the seat. Exhaust ducts are provided for conducting the odor air out of the automobile.

12 Claims, 4 Drawing Sheets

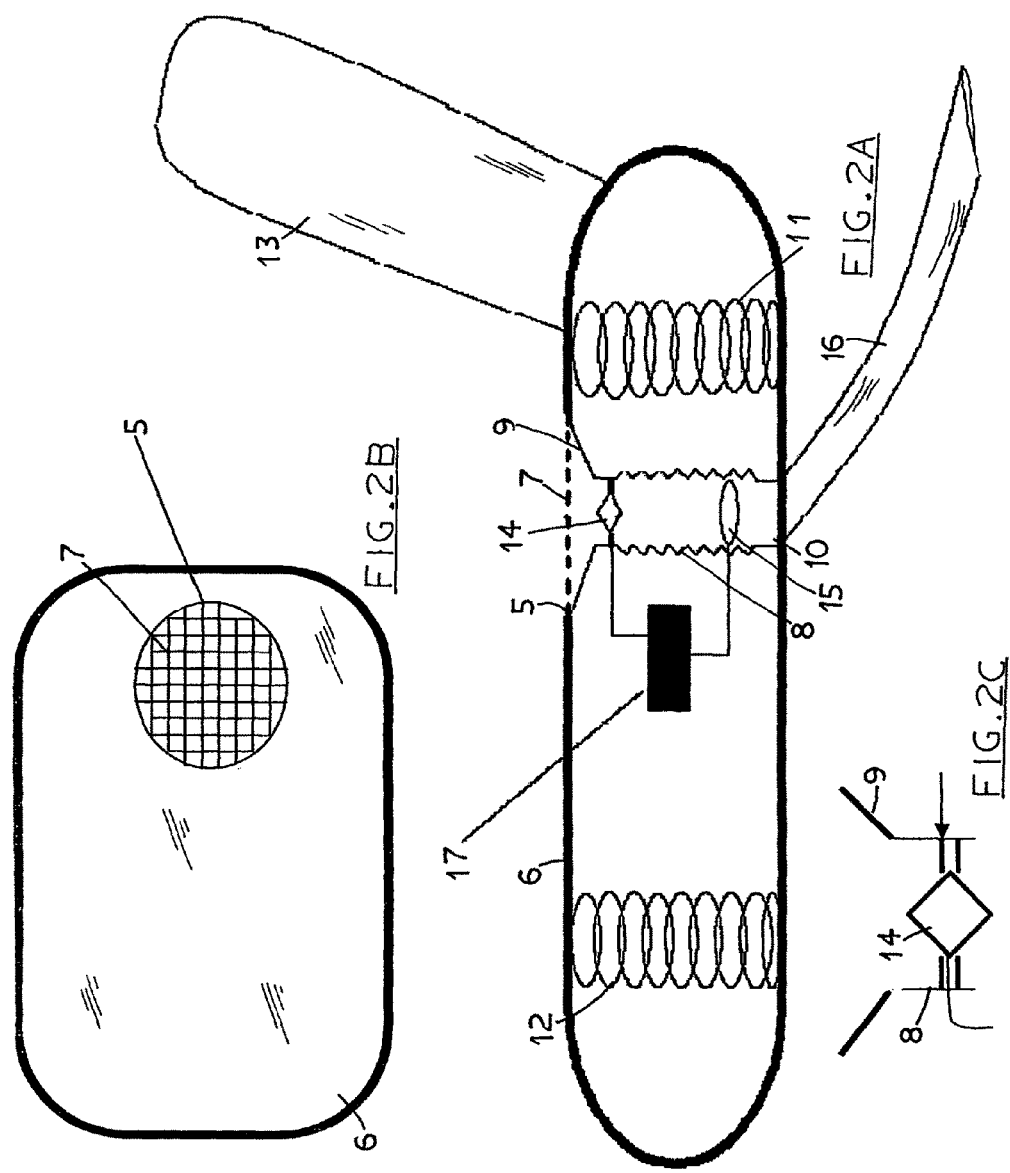

CAR INTERIOR ODOR AIR VENTILATION SYSTEM

BACKGROUND OF THE INVENTION

1. Field of the Invention

This invention relates to a ventilation system and particularly to a ventilation system for removing offensive odor air of expelled human waste gas from the passenger inside an automobile.

2. Background Art

Due to the confined enclosed environment of the interior of an automobile, the odor of expelled human waste gas from a passenger located inside the automobile is particularly offensive. Common ventilation systems in automobile are provided for drawing outside fresh air into its interior, such ventilation systems do not remove air from the interior of the automobile, and any offensive odor in the automobile interior would require a relatively long period of time to dissipate. Opening the windows of the automobile for removing the odors is not practical in winter time in cold climate regions, or when the automobile is traveling in high speed on the highway, or in a dusty or noisy area. Furthermore, drawing outside air into the automobile can largely alter its interior desirable temperature and comfort environment.

SUMMARY OF THE INVENTION

It is a principal object of the present invention to provide a ventilation system which operates to remove effectively the offensive expelled human waste gas from the passenger from the interior of an automobile.

It is another object of the present invention to provide a ventilation system for removing the human waste gas expelled from the passenger in an automobile directly from the seat so as to prevent the offensive odors from pervading into the entire automobile interior.

It is another object of the present invention to provide a ventilation system for removing and exhausting the offensive expelled human waste gas from a passenger out of the automobile.

It is another object of the present invention to provide a ventilation system for removing offensive expelled human waste gas from the passenger in the automobile while maintaining a relatively constant stable interior condition and environment.

BRIEF DESCRIPTION OF THE DRAWINGS

Other objects of this invention will appear in the following description and appended claims, reference being made to the accompanying drawings forming a part of the specification, in which

FIG. 2A is a perspective side elevation view of the seat of the automobile having the ventilation intake formed directly below the passenger for receiving the expelled human waste gas and with the ammonia sensor and air drawing fan of the present invention incorporated therein.

FIG. 2B is an enlarged top perspective elevation view of the top of the cushioned seat of the automobile having the provision of the odor air intake opening according to the present invention.

FIG. 2C is an isolated enlarged schematic view of the ammonia sensor of the system of the present invention.

DETAILED DESCRIPTION OF THE PREFERRED EMBODIMENTS

Figure 1:
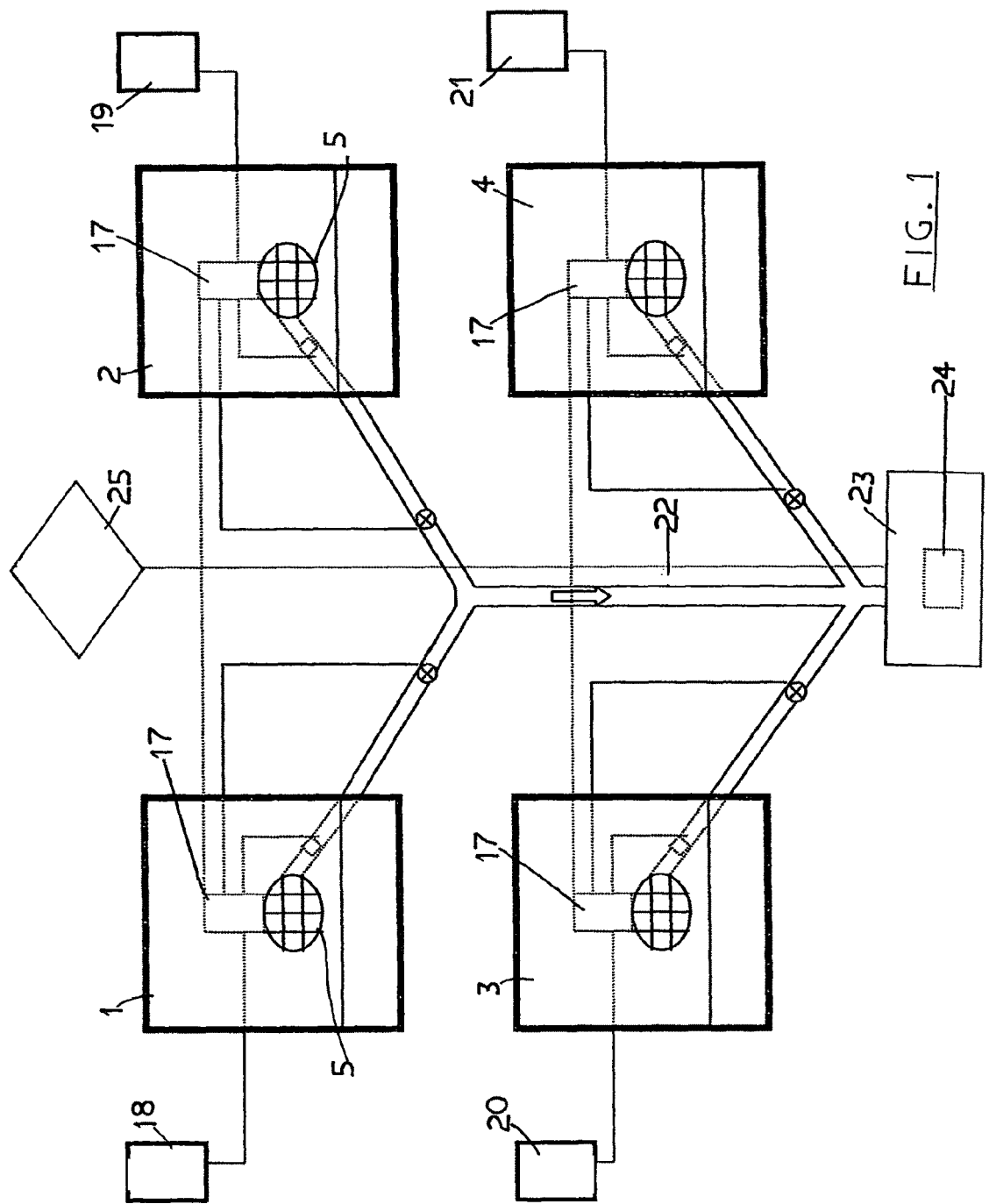
FIG. 1 is a schematic illustration of the odors ventilation system of the present invention.

With reference to the drawings in which like reference numerals designate corresponding parts in the various different views, the ventilation system of the present invention is illustrated with a four-seat automobile having a let front seat 1, a right front seat 2, a left back seat 3, and a right back seat 4. It can be understood that the same system can be employed in an automobile having two to a plurality of seats for the same purposes. As best shown in FIG. 2A a ventilation intake opening 5 is provided in the seat top 6 at the location directly below the passenger sitting on the seat. A screen 7 is provided at the intake opening 5 to prevent foreign objects from falling into the intake opening 5 accidentally. A telescopic pipe 8 is located in the seat cushion in a generally vertical manner and it is connected preferably to the intake opening 5 by a funnel shaped adapter 9 and to an outlet port 10 at the underside of the seat. The telescopic pipe 8 may be constricted under the weight of the passenger sitting on the cushioned seat supported by compress springs illustrated schematically by springs 11 and 12 in FIG. 2A. The seat has a backrest 13.

An ammonia sensor 14 is mounted at the top portion of the resilient pipe 8 and located immediately below the screen 7 for detecting expelled body waste gas from the passenger. An air drawing seat fan 15 may also be located in the telescopic pipe 8 or alternative it may be located in a branch exhaust duct 16 connected to the outlet port 10 of the seat as shown in FIG. 1. The operation of the air drawing seat fan 15 is controlled by a seat fan module 17.

The seat fan module 17 is automatically actuated when the ignition switch of the automobile is turned on as well as an occupancy switch located in the seat cushion detecting a passenger is sitting in the seat. The seat fan module 17 is operated by the ammonia sensor 14 to turn on the fan motor of the air drawing seat fan 15 to operate in a medium fan speed for removing the odor air through the branch exhaust duct 16 when the ammonia sensor 14 detects the existence of body waste gas expelled by the passenger. The seat fan module 17 will maintain the seat fan 15 to operate in a low speed for an additional 15 seconds after the ammonia sensor 14 has detected the complete removal of the odor air. The seat fan module 17 of all the other seats having an occupant, as detected by its seat sensor, may also be operated in the low speed in the meantime for the additional 15 seconds so as to avoid back draft and data sharing. The seat fan module 17 of each seat may also be operated by a manual override switch located on the door switch panel adjacent to each seat to operate the individual seat fan 15 if required. As shown in FIG. 1, a manual override switch 18 is provided for the seat fan module of the left front seat 1; a manual override switch 19 is provided for the right front seat 2; a manual override switch 20 is provided for the left back seat 3; and a manual override switch 21 is provided for the right back seat 4.

Figure 3A:
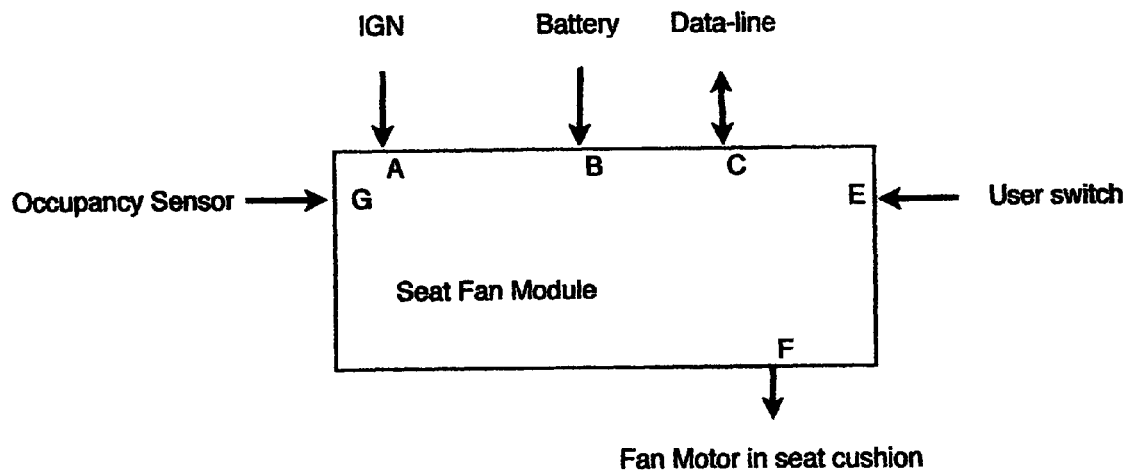
FIG. 3A is a schematic diagram of the seat fan module of the system of the present invention.
Figure 3B:
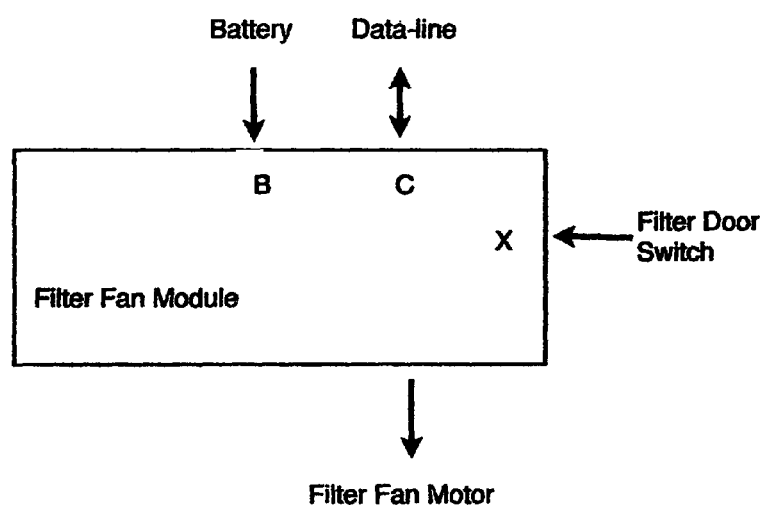
FIG. 3B is a schematic diagram of the filter fan module of the system of the present invention.

The branch exhaust ducts 16 of the seats are connected to a main exhaust duct 22 which is connected to a carbon filter unit 23 having an exhaust fan for expelling the odor air out of the automobile. The exhaust fan of the carbon filter unit 23 is controlled by an exhaust fan filter module 24 as best shown in FIG. 3B as well as a filter door interlocking switch located at the access door of the carbon filter unit 23. The exhaust fan filter module 24 maintains in a memory the operation time of the filter and to provide an indication of the requirement of the replacement of the filter. The system will not operate if the filter is not replaced as required. A diagnostic unit 25 is connected to all the seat fan modules as well as the exhaust fan filter module and it is operative for detecting the normal operation of these modules.

Figure 4:
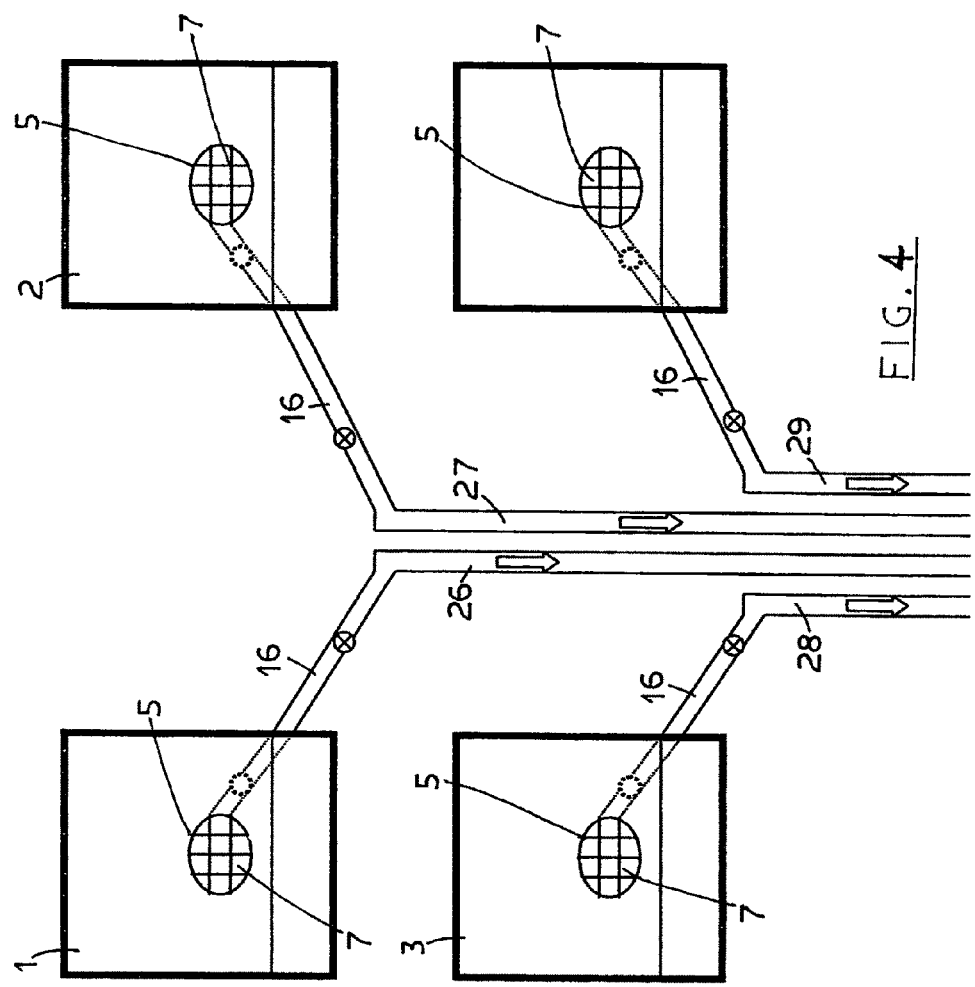
FIG. 4 is a schematic illustration of the alternative embodiment of the system of the present invention having an individual main air exhaust duct for each individual seat.

Alternatively, each of the branch exhaust duct 16 may be connected to a separate main exhaust duct. As shown in FIG. 4, the branch exhaust duct 16 of the seat 1 is connected to a main exhaust duct 26; the branch exhaust duct 16 of the seat 2 is connected to a main exhaust duct 27; the branch exhaust duct 16 of the seat 3 is connected to a main exhaust duct 28; and the branch exhaust duct 16 of the seat 4 is connected to the main exhaust duct 29. The individual main exhaust ducts 26, 27, 28 and 29 may be connected to a single carbon filter unit or to separate individual carbon filter units for expelling the odor air out of the automobile.

While the preferred embodiments of the invention have been described above. It will be recognized and understood that various modifications may be made therein and the appended claims are intended to cover all such modifications which may fall within the spirit and scope of the invention.

What is claimed is:

1. An automobile interior odor air ventilation system operative for removing offensive odor air of human waste gas expelled by a passenger sitting on a seat in said automobile comprising,
    a ventilation intake opening formed in a top portion of said seat, and being adapted to locate directly below said passenger,
    a screen located at said ventilation intake opening,
    a telescopic pipe located in said seat, said telescopic pipe having a top end connected to said intake opening, and a lower end connected to a branch exhaust duct mounted to an outlet port located at an underside of said seat,
    an ammonia sensor mounted in said telescopic pipe and located adjacent to said intake opening,
    an air drawing seat fan mounted in said telescopic pipe,
    a seat fan control module connected to said seat fan and said ammonia sensor and operative to actuate said seat fan when said ammonia sensor having detected body waste gas expelled by said passenger for venting said waste gas to said branch exhaust duct,
    a carbon filter unit connected to said exhaust duct operative for removing said offensive odor of said waste gas.

2. An automobile interior odor air ventilation system according to claim 1 wherein said branch exhaust duct is connected to a main exhaust duct for conducting said odor air out of said automobile.

3. An automobile interior odor air ventilation system according to claim 2 wherein said carbon filter unit has an air filter located at an exhaust end of said main exhaust duct and operative for filtering and exhausting said odor air out of said automobile.

4. An automobile interior odor air ventilation system according to claim 3 including an exhaust fan filter module located in said carbon filter unit and operative for monitoring operation of said carbon filter unit and providing an indication of requirement for replacing said filter in said carbon filter unit, and a diagnostic unit connected to said seat fan control module and to said exhaust fan filter module for detecting normal operation of both said seat fan control module and said exhaust fan filter module.

5. An automobile interior odor air ventilation system according to claim 4 including a manual override switch mounted adjacent to said seat, said override switch being operative to actuate said ventilation system.

6. An automobile interior odor air ventilation system according to claim 5 including a funnel shaped adapter mounted between said intake opening and said top end of said telescopic pipe.

7. An automobile interior air ventilation system for an automobile having a plurality of seats, operative for removing offensive odor air of human waste gas expelled by a passenger sitting on at least a seat in said automobile, comprising
    a ventilation intake opening formed in a top portion of each seat of said plurality of seats, and being adapted to locate directly below a passenger sitting in one said seats,
    a screen located at said ventilation intake opening,
    a telescopic pipe located in a cushion portion of each one of said seats, said telescopic pipe having a top end mounted to said intake opening, and a lower end mounted to an outlet port located at an underside of each one of said seats,
    a plurality of branch exhaust ducts with each individual branch exhaust duct therein connected to said outlet port of each one of said seats,
    an ammonia sensor mounted in said telescopic pipe, and located adjacent to said intake opening,
    an air drawing seat fan mounted in said telescopic pipe and located adjacent to said intake opening,
    a seat fan control module mounted in said cushion portion of each one of said seats, said seat fan module being electrically connected to said ammonia sensor and said air drawing seat fan, and operative when said ammonia sensor having detected body waste gas expelled by a passenger sitting in said seat to actuate said air drawing seat fan to vent said odor air to said branch exhaust duct of a seat with said passenger sitting therein and expelling body waste odor air into said intake opening of said seat,
    a carbon filter unit connected to each one of said branch exhaust ducts.

8. An automobile interior odor air ventilation system according to claim 7 including a main exhaust duct connected to said plurality of branch exhaust ducts and operative to conduct said odor air to outside of said automobile.

9. An automobile interior odor air ventilation system according to claim 8 including a carbon filter exhaust unit mounted at an exit end of said main exhaust duct and operative for filtering said odor air prior to emitting said odor air to outside of said automobile.

10. An automobile interior odor air ventilation system according to claim 9 including an exhaust fan and an exhaust fan control module located in said carbon filter unit, said exhaust fan control module being operative to actuate said exhaust fan for emitting said odor air to outside of said automobile.

11. An automobile interior odor air ventilation system according to claim 7 including a plurality of main exhaust ducts with each one main exhaust duct therein connected to an individual one of said plurality of branch exhaust ducts.

12. An automobile interior odor air ventilation system according claim 11 including a carbon filter unit connected to an exit end of said plurality of main exhaust ducts, and operative for filtering said odor air prior to emitting said odor air outside of said automobile.

* * * * *